US012012733B2

(12) United States Patent
Vaseleniuck et al.

(10) Patent No.: US 12,012,733 B2
(45) Date of Patent: Jun. 18, 2024

(54) STUB OUT RETAINER

(71) Applicants: Austin Grant Vaseleniuck, Mooresville, NC (US); Stacey Lee Daniel, Mooresville, NC (US)

(72) Inventors: Austin Grant Vaseleniuck, Mooresville, NC (US); Stacey Lee Daniel, Mooresville, NC (US)

( * ) Notice: Subject to any disclaimer, the term of this patent is extended or adjusted under 35 U.S.C. 154(b) by 85 days.

(21) Appl. No.: 17/839,849

(22) Filed: Jun. 14, 2022

(65) Prior Publication Data
US 2022/0396934 A1    Dec. 15, 2022

Related U.S. Application Data

(60) Provisional application No. 63/210,170, filed on Jun. 14, 2021.

(51) Int. Cl.
*E03C 1/02* (2006.01)
*F16L 41/12* (2006.01)

(52) U.S. Cl.
CPC .............. *E03C 1/021* (2013.01); *F16L 41/12* (2013.01); *E03C 2201/50* (2013.01)

(58) Field of Classification Search
CPC ........ E03C 1/021; E03C 2201/50; F16L 5/00; F16L 5/10
See application file for complete search history.

(56) References Cited

U.S. PATENT DOCUMENTS

| | | | | |
|---|---|---|---|---|
| 611,418 | A * | 9/1898 | Russell | F16L 5/00 126/317 |
| 1,212,824 | A * | 1/1917 | Sessions | F16L 5/00 126/317 |
| 1,260,628 | A * | 3/1918 | Biedenmeister | F16L 5/00 126/317 |
| 9,057,457 | B2 * | 6/2015 | Wanweerakul | D06F 39/083 |
| 10,781,967 | B1 * | 9/2020 | DeCosta | F16M 13/02 |

* cited by examiner

*Primary Examiner* — Kevin F Murphy
(74) *Attorney, Agent, or Firm* — Trego, Hines & Ladenheim, PLLC; Brandon C. Trego; Jonathan M. Hines (57) ABSTRACT

A stub out retainer is disclosed. The stub out retainer includes a first clamp section having a front end with a first plate half and a first front collar half; a second clamp section having a front end with a second plate half and a second front collar half; and wherein the first and second clamp sections are configured to mate together such that the first plate half and the second plate half define an escutcheon plate, the first front collar half and second front collar half define a cylindrical front collar.

22 Claims, 13 Drawing Sheets

STUB OUT RETAINER

BACKGROUND OF THE INVENTION

This invention relates generally to plumbing, and more particularly to a stub out retainer for retaining pipes and/or tubing, such as PEX, extending through a wall.

In conventional plumbing, pipes often penetrate buildings in visible locations. Holes must be formed in a finished surface (such as a wall, floor, or ceiling) to accommodate the pipe penetrations. There is a desire to make the holes as quickly as possible and with minimal effort in measuring and cutting. As a result, the holes are often oversize compared to the pipe diameter and can have rough edges. This may be aesthetically unacceptable.

Furthermore, many types of plumbing pipe are flexible and may not be supported by brackets or other restraints behind the wall opening.

Accordingly, there is a need to neatly finish oversize pipe wall penetrations and provide support for flexible piping.

BRIEF SUMMARY OF THE INVENTION

This need is addressed by the present invention, which provides a stub out retainer configured to cover an enlarged wall opening.

According to one aspect of the invention, a stub out retainer includes a first clamp section having a front end with a first plate half and a first front collar half; a second clamp section having a front end with a second plate half and a second front collar half; and wherein the first and second clamp sections are configured to mate together such that the first plate half and the second plate half define an escutcheon plate, the first front collar half and second front collar half define a cylindrical front collar.

According to another aspect of the invention, a stub out retainer includes a first clamp section having a front end with a first plate half and a first front collar half, a rear end having a first rear collar half, the first front and first rear collar halves being interconnected by a first top beam half and a first bottom beam half; a second clamp section having a front end with a second plate half and a second front collar half, a rear end having a second rear collar half, the second front and second rear collar halves being interconnected by a second top beam half and a second bottom beam half; and wherein the first and second clamp sections are configured to mate together such that the first plate half and the second plate half define an escutcheon plate, the first front collar half and second front collar half define a cylindrical front collar, the first rear collar half and second rear collar half define a rear collar, the first top beam half and second top beam half form a top beam, and the first bottom beam half and second bottom beam half form a bottom beam.

According to another aspect of the invention, a method of using the stub out retainer of claim 11 includes the steps of receiving a pipe between the first and second clamp sections; mating the first and second clamp sections around the pipe to form the stub out retainer and sliding the stub out retainer along the pipe until reaching a hole in a wall where the pipe extends through; pushing the stub out retainer into the hole until the escutcheon plate rests against a surface of the wall; and securing the stub out retainer in the hole.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
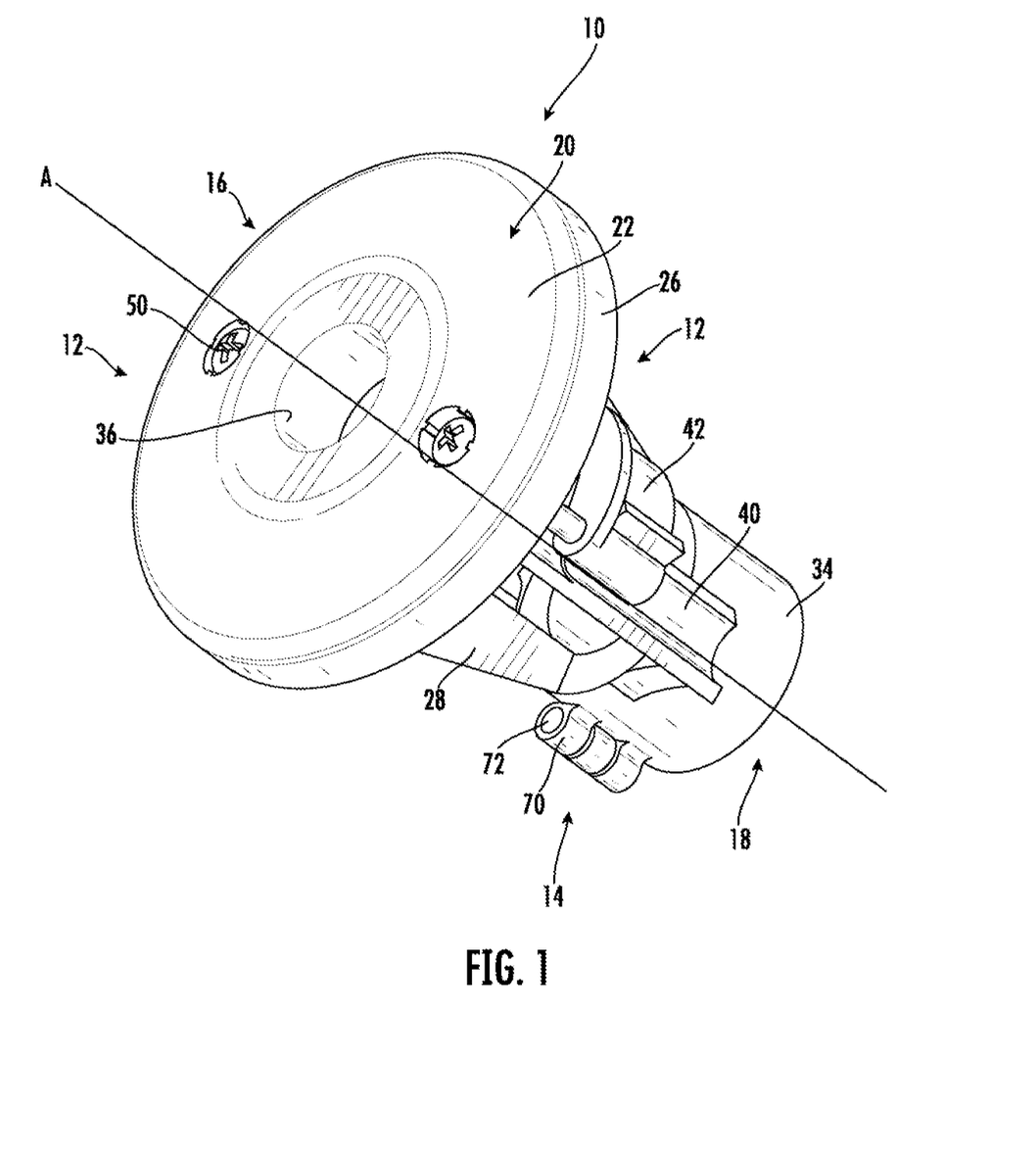
FIG. 1 is a front perspective view of an exemplary embodiment of a stub out retainer.
Figure 2:
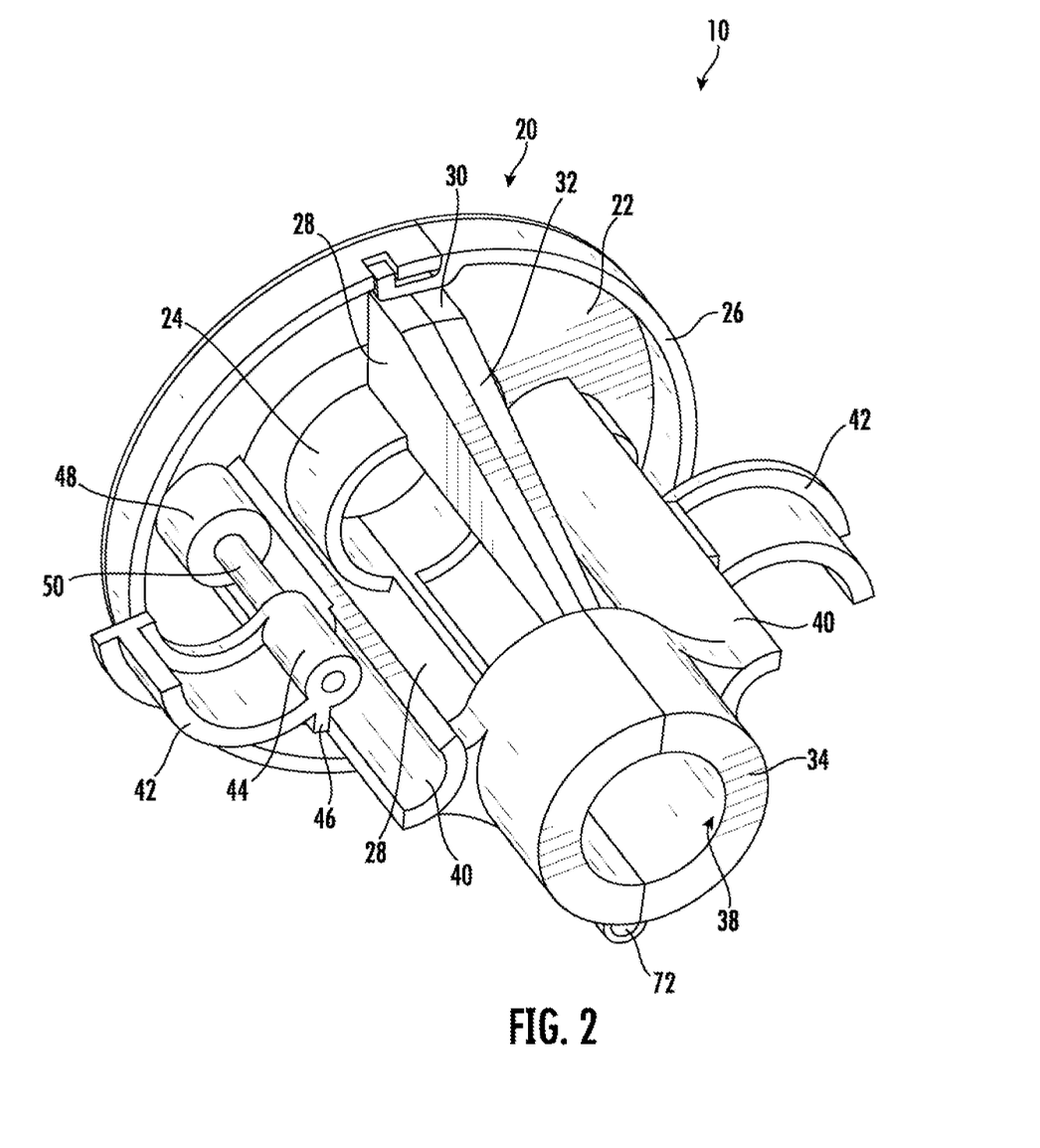
FIG. 2 is a rear perspective view of the stub out retainer of FIG. 1.

Referring to the drawings wherein identical reference numerals denote the same elements throughout the various views, FIGS. 1 and 2 illustrate an exemplary stub out retainer 10. The complete assembled stub out retainer 10 comprises two clamp sections 12 which are connected to each other by a hinge 14.

The assembled stub out retainer 10 extends along a centerline axis "A" between a front end 16 and a rear end 18. An escutcheon 20 is disposed at the front end 16. The escutcheon 20 includes an escutcheon plate 22, with a cylindrical front collar 24 near a center portion of the escutcheon plate 22, and a flange 26 at a periphery of the escutcheon plate 22.

A pair of diametrically-opposed beams 28 extend aft from the escutcheon 20. The beams 28 include a registration surface 30 adjacent the escutcheon 20, and a tapered surface 32 extending from the registration surface 30 to a cylindrical rear collar 34.

The front collar 24 includes a front bore 36 and the rear collar 34 includes a rear bore 38. The beams 28 support the rear collar 34 such that the front and rear bores 36, 38 are coaxial about centerline axis A. The bores 36, 38 have a diameter selected to accept a predetermined size of pipe.

A pair of diametrically-opposed channels 40 extend from the escutcheon 20 to the rear collar 34. These channels 40 are concave outward and are located at approximately at a 90 degree offset position relative to the beams 28.

Each channel 40 receives a wing 42 which is a generally semi-annular structure. In the illustrated example, each wing 42 has a T-shaped cross-section to increase its bending stiffness. At its proximate end, each wing 42 includes a receptacle 44 for receiving a drive screw, described below, as well as a stop tab 46 sized and shaped to bear against an axial edge of the corresponding channel 40.

The escutcheon 20 includes a pair of diametrically-opposed counterbores 48. These are aligned with respective ones of the channels.

Figure 3:
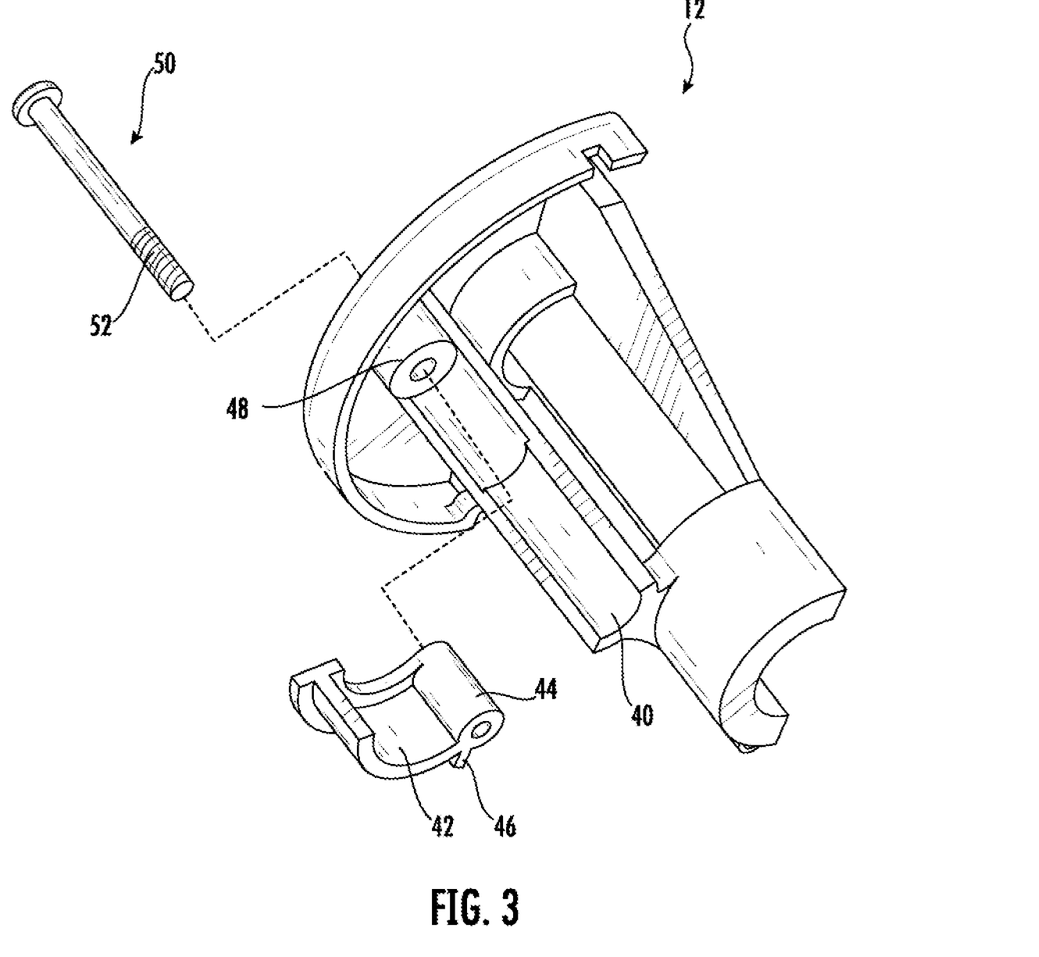
FIG. 3 is an exploded view of a clamp section along with a screw and wing.

A pair of drive screws 50 are provided. As best seen in FIG. 3, the head of each drive screw 50 is received in one of the counterbores 48, and the threaded shank 52 is received in one of the receptacles 44 of the wings 42.

Figure 4:
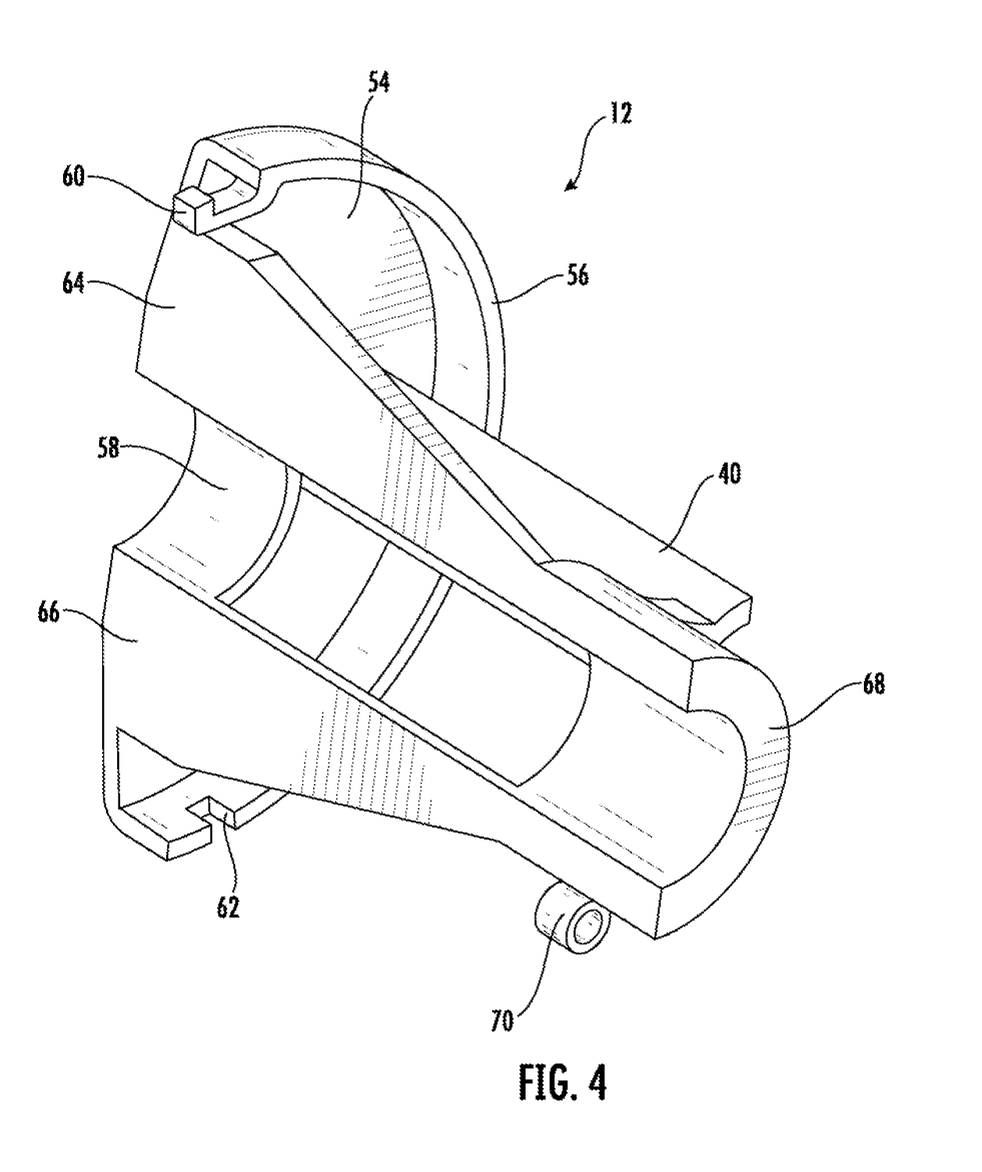
FIG. 4 is a perspective view of a clamp section of the stub out retainer of FIG. 1.
Figure 5:
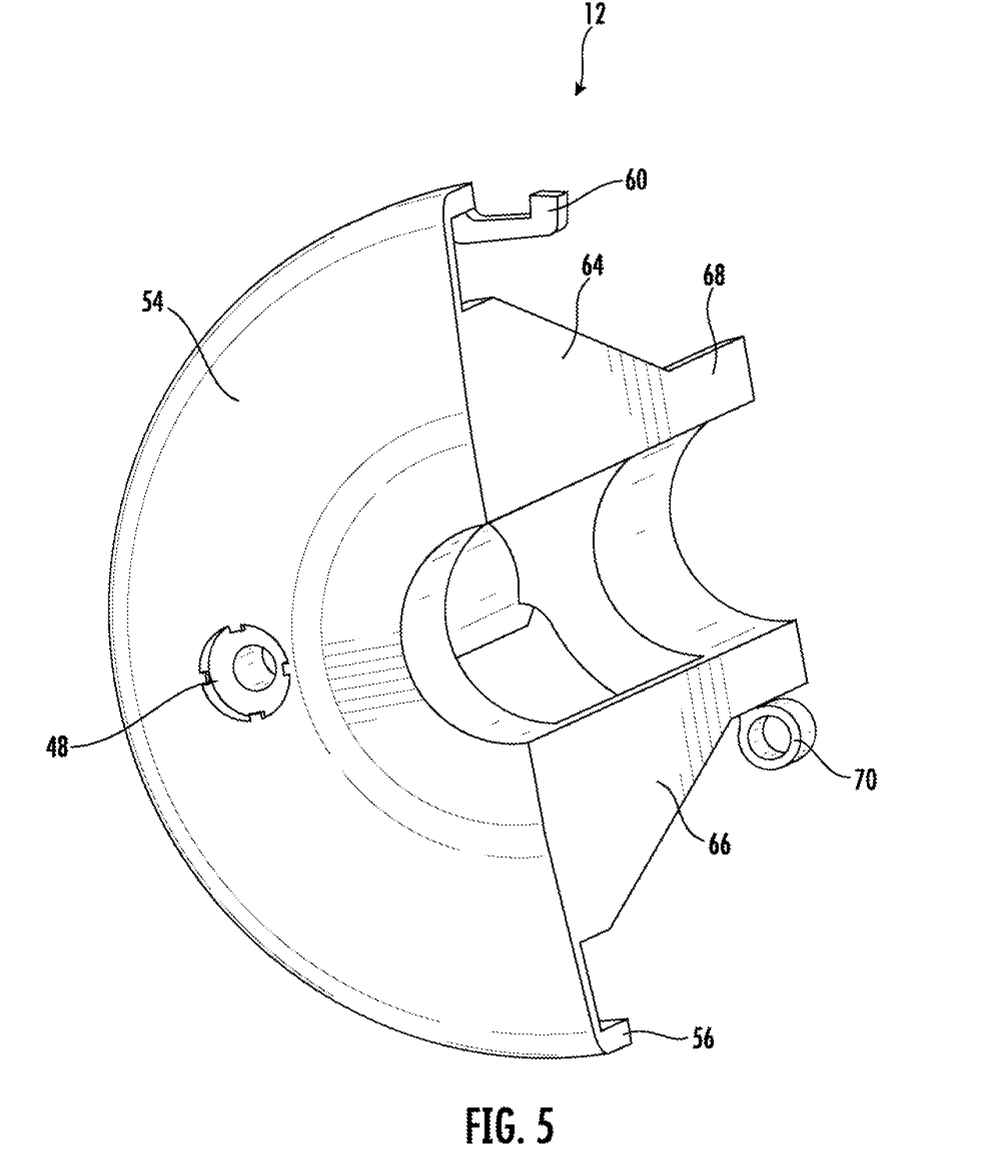
FIG. 5 is another perspective view of the clamp section of FIG. 3.

FIGS. 4 and 5 illustrate one of the clamp sections 12 in more detail.

The clamp section 12 includes an escutcheon plate half 54 with a flange half 56, front collar half 58, and one counterbore 48. Each clamp section 12 includes a male escutcheon snap 60 diametrically opposed to a female escutcheon snap 62. It further includes a top beam half 64, a bottom beam half 66, rear collar half 68, at least one hinge eyelet 70, and one channel 40.

In the illustrated example, the clamp sections 12 are identical to each other except for the hinge eyelets 70, which have forms complementary to each other, e.g., one section 12 may have two eyelets 70 positioned to receive one eyelet 70 of the other section 12 between them. When assembled, a hinge pin 72 (FIG. 2) extends through the interleaved hinge eyelets 70, forming the complete hinge.

Each clamp section 12 is functionally a unitary element. It may be manufactured as a unitary, integral or monolithic component by means such as machining, casting, or molding in one example, the clamp section 12 may be formed by injection molding. Alternatively, it could be built up from separate components that are joined together.

The clamp section 12 may be made from any material having suitable strength such as a metal alloy, plastic, or composite material. Plastic materials have been found to be beneficial as they provide some flexibility in the finished product which makes installation easier.

While the illustrated example stub out retainer 10 is shown as being constructed from two pipe clamp sections 12 mechanically assembled to each other, it will be understood that it could be made as a single piece. For example, an additive manufacturing method such as 3D printing or stereolithography could be used to construct the two clamp sections 12 and the hinge pin 72 as one unit. Alternatively, additive manufacturing or conventional molding can be used to construct the two clamp sections 12 as one unit with a live hinge or similar ligament (not shown) connecting the two sections.

Figure 6:
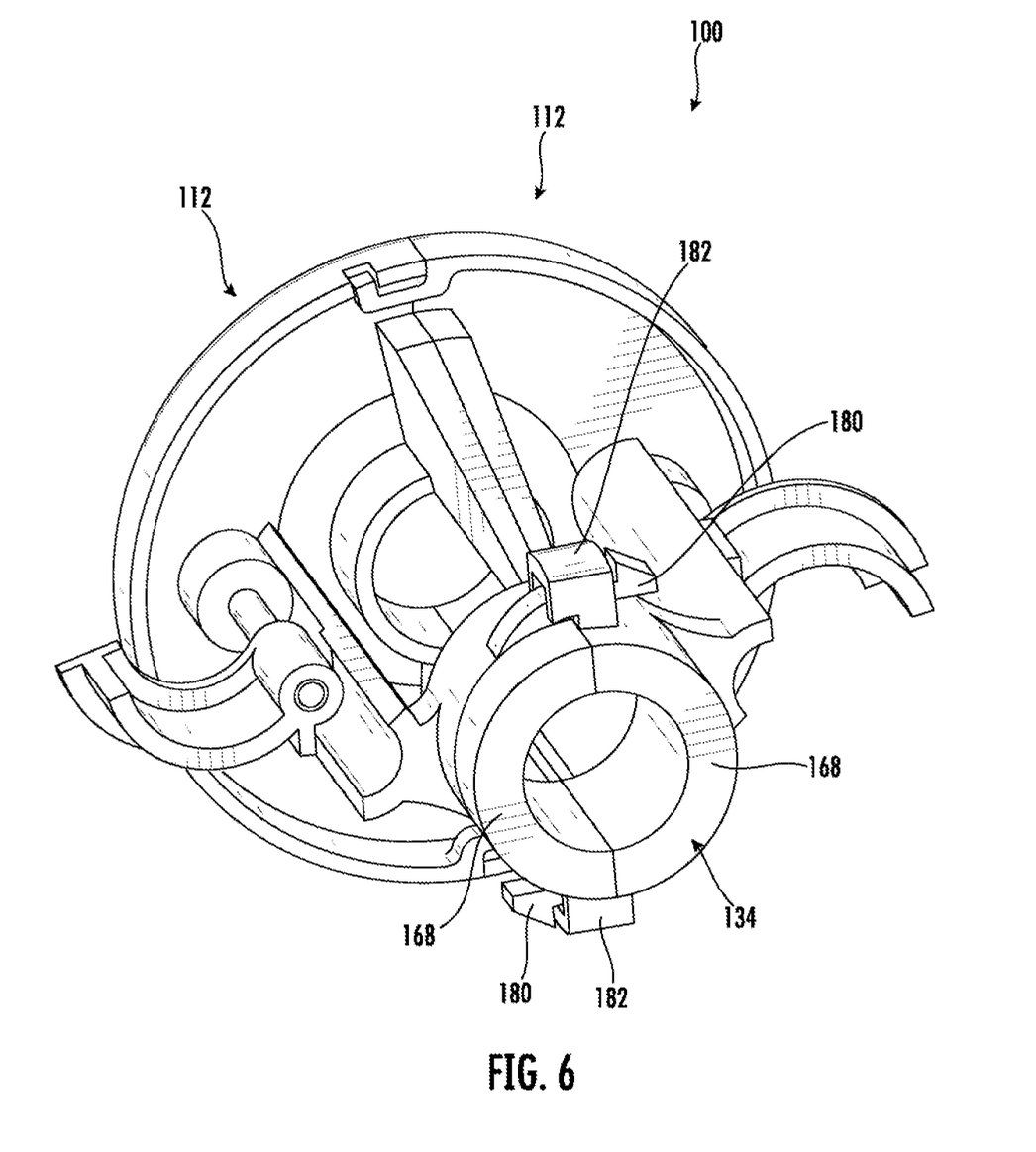
FIG. 6 is a perspective view of an alternative embodiment of a stub out retainer.

FIG. 6 illustrates an alternative stub out retainer 100 comprising pipe clamp sections 112 which are mostly identical to the clamp sections 12 described above. The pipe clamp sections 112 differ from the pipe clamp sections 12 in that they lack the hinge eyelets 70. Instead, each rear collar half 168 includes a male collar snap 180 diametrically opposed to a female collar snap 182.

Figure 7:
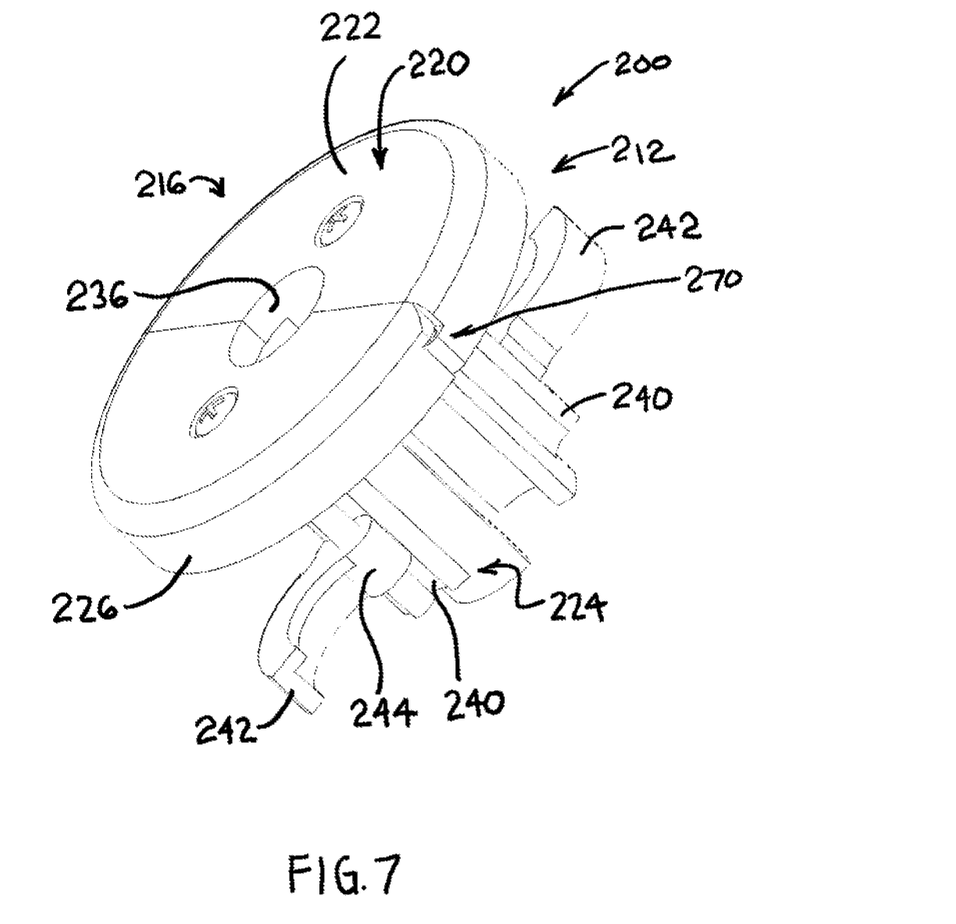
FIG. 7 is a front perspective view of an alternative embodiment of a stub out retainer.
Figure 8:
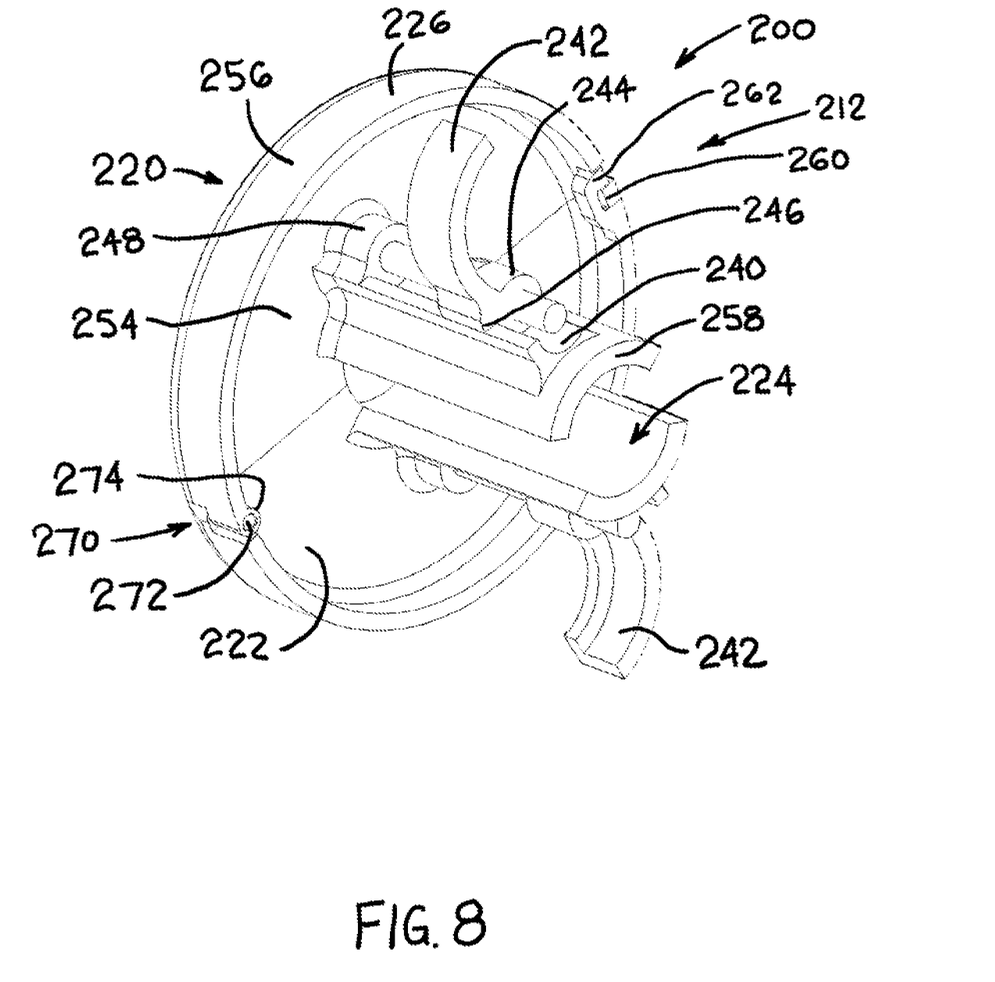
FIG. 8 is a rear perspective view of the stub out retainer of FIG. 7.

FIGS. 7 and 8 illustrate an alternative stub out retainer 200 having pipe clamp sections 212. Unlike pipe clamp sections 12, pipe clamp sections 212 do not include a rear end with a rear collar. As shown, like pipe clamp sections 12, pipe clamp sections 212 include a front end 216 with an escutcheon 220 disposed thereon. The escutcheon 220 includes an escutcheon plate 222, with a cylindrical front collar 224 near a center portion of the escutcheon plate 222, and a flange 226 at a periphery of the escutcheon plate 222. The front collar 224 includes a front bore 236.

A pair of diametrically-opposed channels 240 extend outwardly from the escutcheon 220 along sides of front collar 224. These channels 240 are concave outward and such that each channel 240 receives a wing 242 which is a generally semi-annular structure. At its proximate end, each wing 242 includes a receptacle 244 for receiving a drive screw as described above with respect to pipe clamp sections 12, as well as a stop tab 246 sized and shaped to bear against an axial edge of the corresponding channel 240.

As illustrated, each clamp section 212 includes an escutcheon plate half 254 with a flange half 256, front collar half 258, and one counterbore 248. One clamp section 212 has a male escutcheon snap 260 and the other clamp section includes a female escutcheon snap 262 to allow the clamp sections 212 to fasten together in a secured closed position. The clamp sections 212 are hinged together by hinge 270 to allow the clamp sections to move between an open position and the secured closed position. The hinge 270 is formed by a hinge pin 272 formed in one pipe clamp section 212 and an eyelet 274 formed in flange 226 of the other pipe clamp section 212. It should be appreciated that the hinge pin 272 may be integrally formed with the pipe clamp section 212 or a separate pin connected to the pipe clamp section 212.

Figure 9:
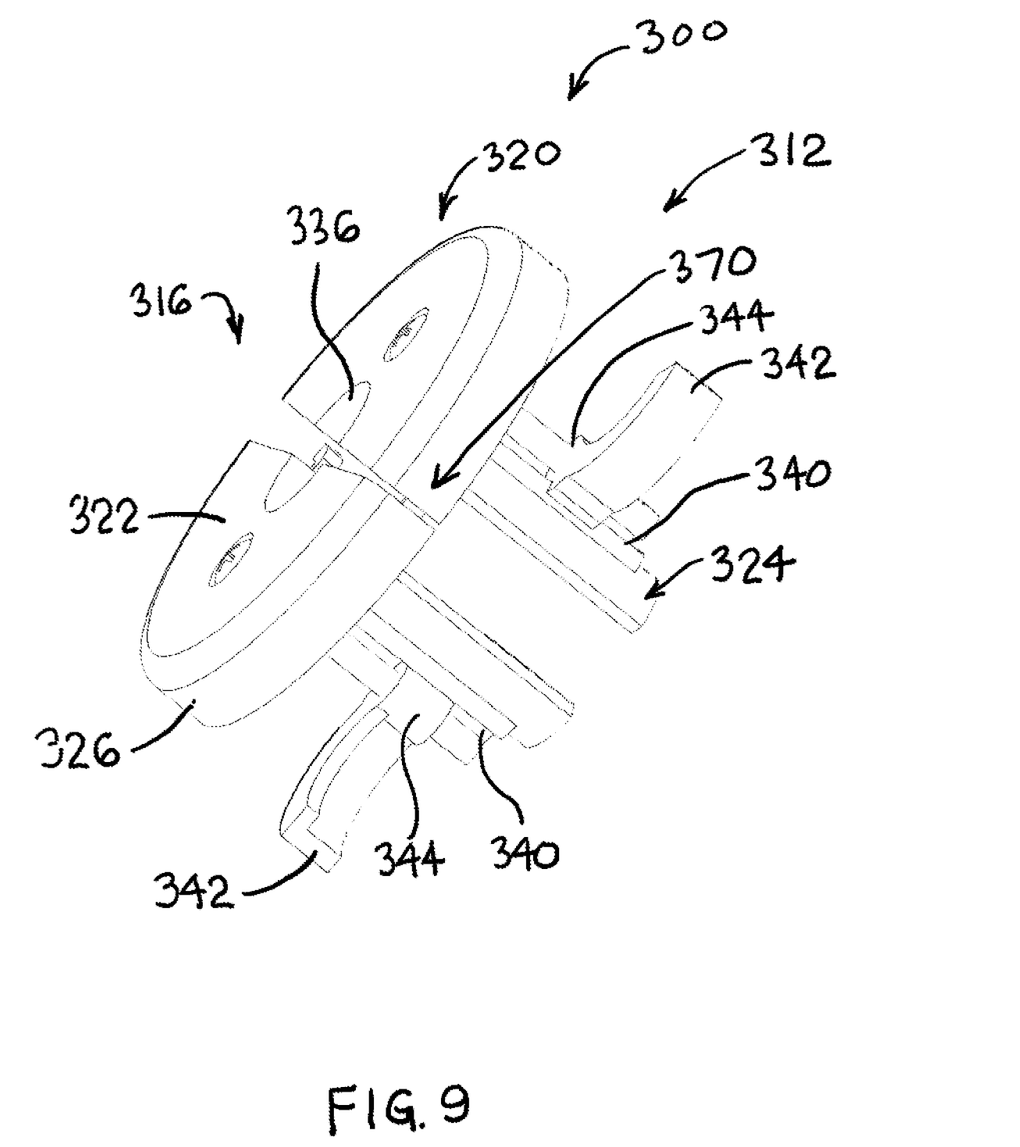
FIG. 9 is a front perspective view of an alternative embodiment of a stub out retainer.
Figure 10:
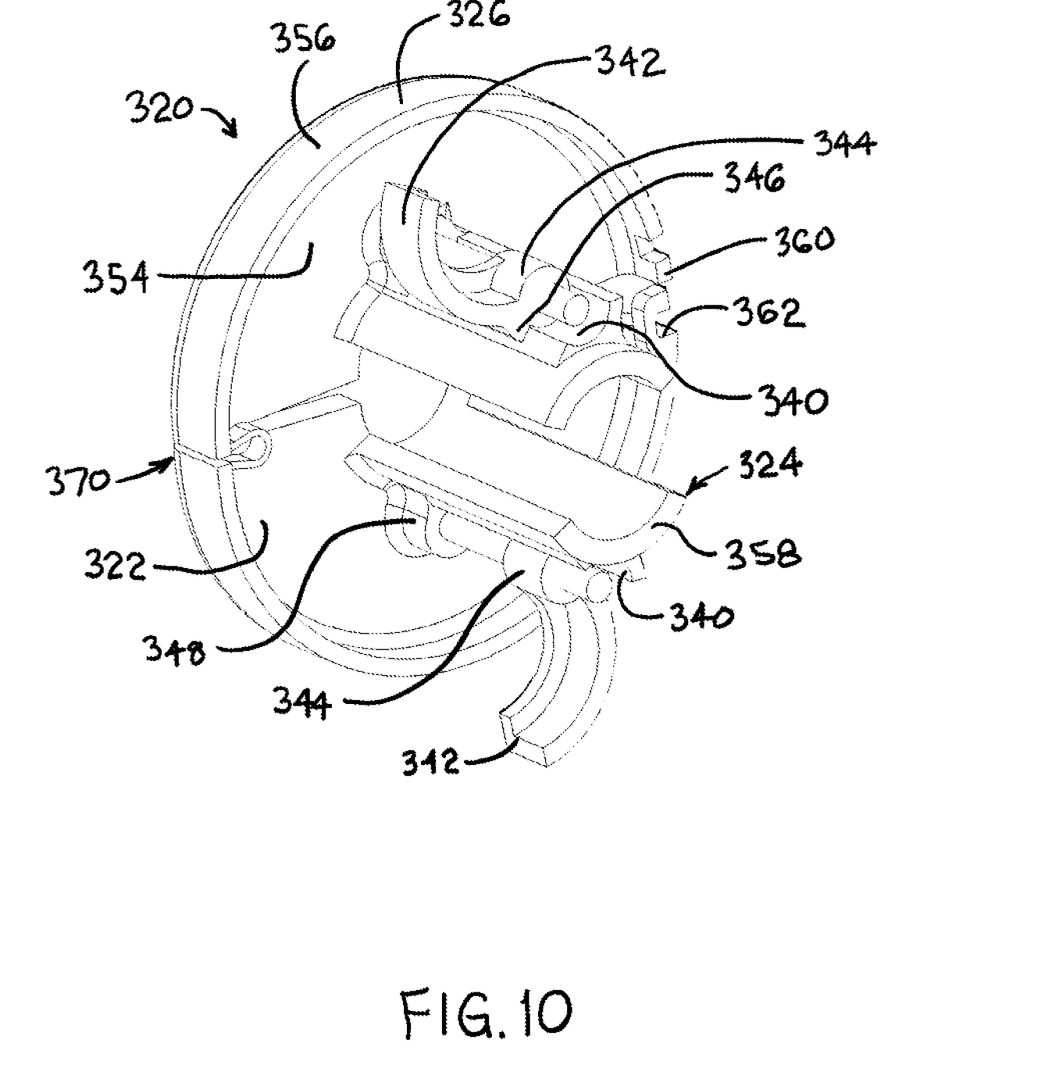
FIG. 10 is a rear perspective view of the stub out retainer of FIG. 9.

FIGS. 9 and 10 illustrate an alternative stub out retainer 300. Like the stub out retainer 200, stub out retainer 300 includes pipe clamp sections 312 similar to pipe clamp sections 212. More particularly, pipe clamp sections 312 include a front end 316 with an escutcheon 320 disposed thereon. The escutcheon 320 includes an escutcheon plate 322, with a cylindrical front collar 324 near a center portion of the escutcheon plate 322, and a flange 326 at a periphery of the escutcheon plate 322. The front collar 324 includes a front bore 336.

A pair of diametrically-opposed channels 340 extend outwardly from the escutcheon 320 along sides of front collar 324. These channels 340 are concave outward and such that each channel 340 receives a wing 342 which is a generally semi-annular structure. At its proximate end, each wing 342 includes a receptacle 344 for receiving a drive screw as described above with respect to pipe clamp sections 12, as well as a stop tab 346 sized and shaped to bear against an axial edge of the corresponding channel 340.

As illustrated, each clamp section 312 includes an escutcheon plate half 354 with a flange half 356, front collar half 358, and one counterbore 348. One clamp section 312 has a male escutcheon snap 360 and the other clamp section includes a female escutcheon snap 362 to allow the clamp sections 312 to fasten together in a secured closed position. The clamp sections 312 are hinged together by hinge 370 to allow the clamp sections to move between an open position and the secured closed position. The hinge 370 is formed by a horseshoe shaped hinge 372. As shown, the hinge 372 is integrally formed with the flange 326 and flexes as the clamp sections 312 move between the open and closed positions.

The stub out retainer 10 is used as follows.

Figure 13:
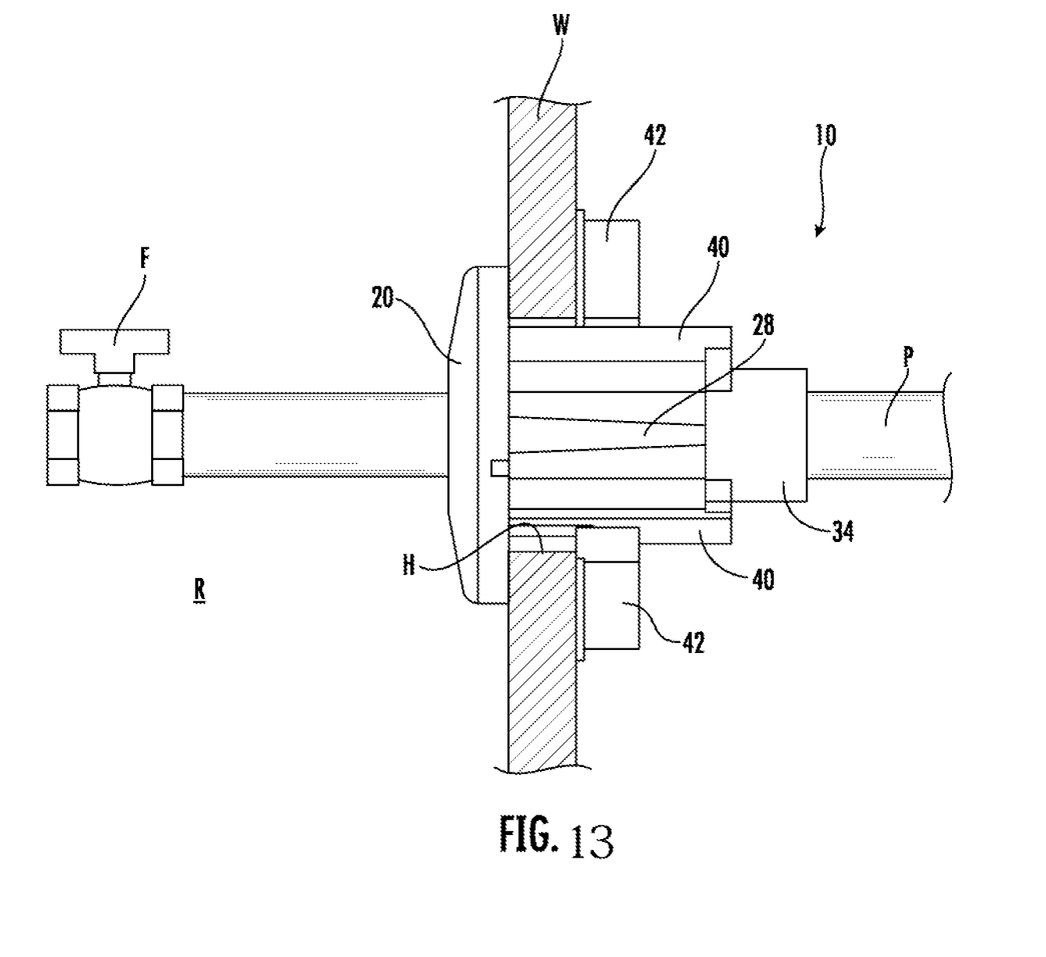
FIG. 13 is a side view of the stub out retainer of FIG. 1 installed in a wall structure.

Initially, (see FIG. 13) a hole "H" is formed in a wall "W" that forms a boundary of a room "R". In typical light residential construction, the exposed surface of the wall W comprises gypsum board, wood or composite paneling, or some other relatively thin material having an overall thickness in the range of approximately 6 mm (or ¼ inch) to 16 mm (or ⅝ inch), with 13 mm (or ½ inch) being very common. The hole H has a preselected diameter consistent with the dimensions of the pipe claim 10. For example, the hole H may have a diameter of approximately 50 mm (or 2 inches). A pipe "P" passes through the hole H, and extends into the room R, leaving a considerable open space between the exterior of the pipe P and the edge of the hole H. This is consistent with the rough stage of construction. The pipe P may be open, or plugged, or may have a fitting F such as a valve connected to the end thereof. At this stage, the pipe P may be unsupported at the wall penetration. While metallic pipe (e.g., copper) is sometimes used, the pipe P is often a flexible plastic material such as crosslinked polyethylene (PEX), polybutylene (PB), or polyvinylchloride (PVC). It is noted that the wall W is merely an example of a structure that could have a pipe P passing through it. Pipes routinely pass through other similar structures such as floors or ceilings. The stub out retainer 10 is suitable for use with any type of structure similar to the wall W, without regard to the structure's location or orientation.

The stub out retainer 10 is usable to secure the pipe P in the hole H and provide a finished appearance, without having to be installed before the fitting F.

Figure 11:
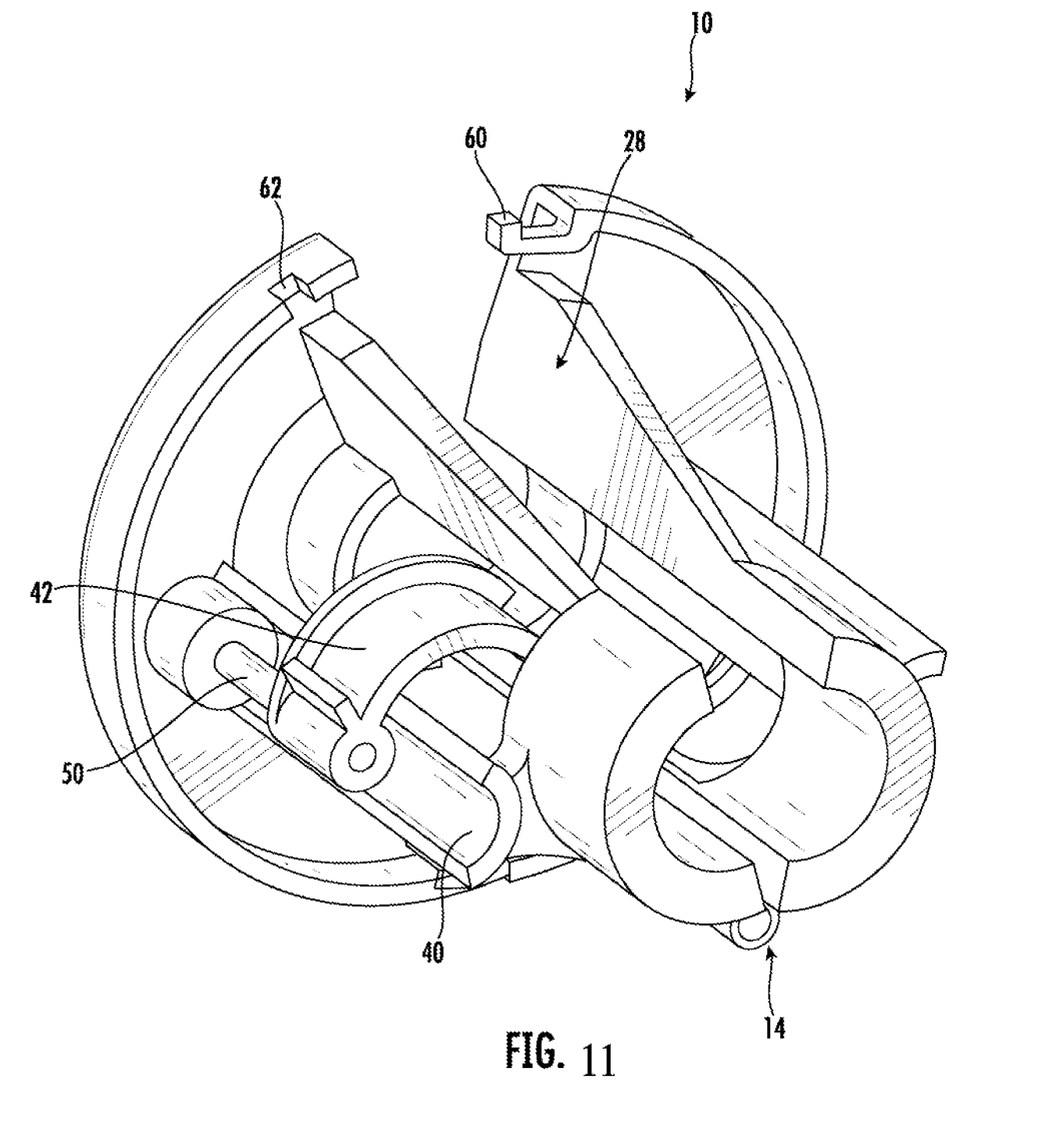
FIG. 11 is a perspective view of the stub out retainer of FIG. 1 in an open position to receive a pipe, with the wings thereof retracted.

Initially, the stub out retainer 10 is put in the open position as seen in FIG. 11. The hinge 14 allows the clamp sections 12 to swing apart. The material and design of the stub out retainer 10, in particular the length of the beams 28, allows it to flex open sufficiently to accept the pipe P.

In the case of the alternative embodiment 100 shown in FIG. 6, the separate clamp sections 112 are placed around the pipe P.

Figure 12:
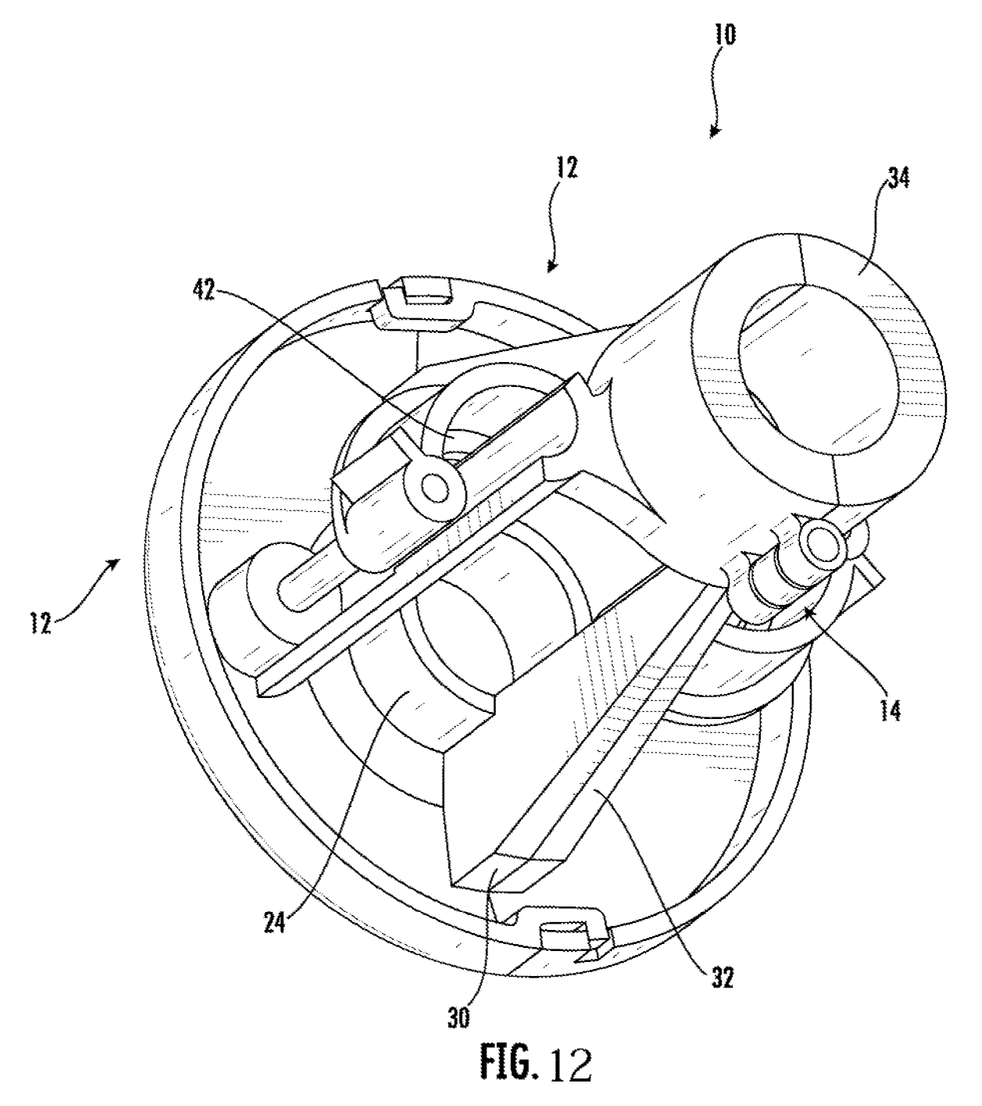
FIG. 12 is a perspective view of the stub out retainer of FIG. 1 in a closed position, with the wings thereof retracted.

Next, the stub out retainer 10 is closed over the pipe P, so the front and rear collars 24 and 34 surround the pipe P. The pairs of escutcheon snaps 60 and 62 are engaged to secure the complete escutcheon 20 together. The closed position is shown in FIG. 12.

In the case of the alternative embodiment 100 shown in FIG. 6, the pairs of collar snaps 180, 182 would be engaged with each other to secure the rear collar 134 around the pipe P.

The diameter of the bores 36, 38 are selected to support the pipe P securely while permitting the stub out retainer 10 to be installed without excessive force. In one example, the diameters of the bores 36, 38 may be approximately 1% to 2% larger than the outside diameter of the pipe P.

Subsequent to closing the stub out retainer 10 around the pipe P, the usage is identical for either embodiment. The stub out retainer 10 is slid along the pipe P and inserted into the hole H. As it is pushed into the hole, the tapered surfaces 32 of the beams 28 engage the hole H and force the pipe clamp 10 to a central position within the hole H. The stub out retainer 10 is pushed home until the escutcheon 20 bottoms out against the wall W. As it is pushed fully in place, the registration surfaces 30 engage the rim of the hole H and keep the stub out retainer 10 and pipe P centered. This forced centering ensures that the portion of the escutcheon 20 extending beyond the beams 28 will cover the exposed hole H.

Next, the drive screws 50 are turned using a screwdriver or similar tool. As shown in FIG. 2, the first application of torque causes the wings 42 to pivot to the extended position, until they are stopped by the stop tabs 46 engaging the edges of the channels 40. Further application of torque causes the wings 42 to be drawn axially towards the escutcheon 20. This drive screws 50 are driven until the wings 42 firmly clamp the wall W between the escutcheon 20 and the wings 42. See FIG. 13. The pipe P is thus secured positioned in the hole H, and the hole H is hidden by the escutcheon 20. The spaced-apart front and rear collars 24, 34 prevent the pipe P from being kinked or curving too tightly.

The foregoing has described a stub out retainer and a method for its use. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A stub out retainer, comprising:
   a first clamp section having a front end with a first plate half and a first front collar half;
   a second clamp section having a front end with a second plate half and a second front collar half;
   a wing operably connected to the first plate half, the wing including a receptacle for receiving a drive member extending through the first plate half, the drive member being rotated to move the wing closer to or further away from the first plate half; and
   wherein the first and second clamp sections are configured to mate together such that the first plate half and the second plate half define an escutcheon plate, the first front collar half and second front collar half define a cylindrical front collar.

2. The stub out retainer of claim 1, further including a rear end having a first rear collar half and a second rear collar half, the first front and first rear collar halves being interconnected by a first beam half and the second front and second rear collar halves being interconnected by a second beam half.

3. The stub out retainer of claim 2, wherein the first rear collar half and the second rear collar half define a rear collar.

4. The stub out retainer of claim 2, further including a first channel extending between the first plate half and the first rear collar half.

5. The stub out retainer of claim 2, further including a second channel extending between the second plate half and the second rear collar half.

6. The stub out retainer of claim 2, wherein the first rear collar half is secured to the second rear collar half by a hinge to form the rear collar.

7. The stub out retainer of claim 2, wherein the first rear collar half includes a male snap and a diametrically opposed female snap and the second rear collar half includes a male snap and a diametrically opposed female snap, and wherein the first and second rear collar halves are connected together by mating the male snap of the first rear collar half with the female snap of the second rear collar half and the male snap of the second rear collar half with the female snap of the first rear collar half to form the rear collar.

8. The stub out retainer of claim 1, wherein the receptacle includes a stop tab to limit pivotal rotation of the wing when the drive member is rotated.

9. The stub out retainer of claim 1, wherein the first plate half includes a male snap and a diametrically opposed female snap.

10. The stub out retainer of claim 9, wherein the second plate half includes a male snap and diametrically opposed female snap, wherein the male and female snaps of the second plate half engage the female and male snaps of the first plate half to secure the first and second clamp sections together.

11. The stub out retainer of claim 1, wherein the first plate half includes a male snap and a diametrically opposed eyelet and the second plate half includes a female snap and a diametrically-opposed pin, the eyelet and pin mating together to form a hinge to allow the first and second clamp sections to move between a closed position and an open position, and wherein the male and female snaps mate together to secure the first and second clamp sections in a closed position.

12. The stub out retainer of claim 1, wherein the first plate half includes a male snap and the second plate half includes a female snap, the male and female snaps mating together to secure the first and second plate halves in a closed position.

13. The stub out retainer of claim 12, wherein the first and second plate halves are connected together by a hinge positioned diametrically opposed to the male and female snaps, the hinge being integrally formed with a first flange half of the first clamp section and a second flange half of the second clamp section.

14. A stub out retainer, comprising:
a first clamp section having a front end with a first plate half and a first front collar half, a rear end having a first rear collar half, the first front and first rear collar halves being interconnected by a first top beam half and a first bottom beam half;
a second clamp section having a front end with a second plate half and a second front collar half, a rear end having a second rear collar half, the second front and second rear collar halves being interconnected by a second top beam half and a second bottom beam half; and
wherein the first and second clamp sections are configured to mate together such that the first plate half and the second plate half define an escutcheon plate, the first front collar half and second front collar half define a cylindrical front collar, the first rear collar half and second rear collar half define a rear collar, the first top beam half and second top beam half form a top beam, and the first bottom beam half and second bottom beam half form a bottom beam.

15. The stub out retainer of claim 14, wherein the top beam and bottom beam are diametrically opposed.

16. The stub out retainer of claim 15, wherein each of the top and bottom beams are tapered such that at the escutcheon plate the top and bottom beams have a first width larger than a second width of the top and bottom beams positioned at the rear collar.

17. The stub out retainer of claim 14, further including a concave first channel extending between the first plate half and the first collar half and a concave second channel diametrically opposed to the first channel extending between the second plate half and the second collar half.

18. The stub out retainer of claim 17, wherein each of the first and second channels are positioned at about a ninety degree offset position relative to the top and bottom beams.

19. The stub out retainer of claim 18, further including a first wing positioned in the first channel and a second wing positioned in the second channel, the first and second wings being configured to pivot in the channel from an unsecured position to a secured position.

20. The stub out retainer of claim 19, further including a first drive member extending through the first half plate and operably connected to the first wing and a second drive member extending through the second half plate and operably connected to the second wing, wherein rotating the first and second drive members causes the first and second wings to move linearly between the escutcheon plate and the rear collar.

21. The stub out retainer of claim 14, wherein the front collar and rear collar each include a bore defined therethrough.

22. A method of using the stub out retainer of claim 14 including the steps of:
receiving a pipe between the first and second clamp sections;
mating the first and second clamp sections around the pipe to form the stub out retainer and sliding the stub out retainer along the pipe until reaching a hole in a wall where the pipe extends through;
pushing the stub out retainer into the hole until the escutcheon plate rests against a surface of the wall; and
securing the stub out retainer in the hole.

\* \* \* \* \*